UNITED STATES PATENT OFFICE 1,959,177

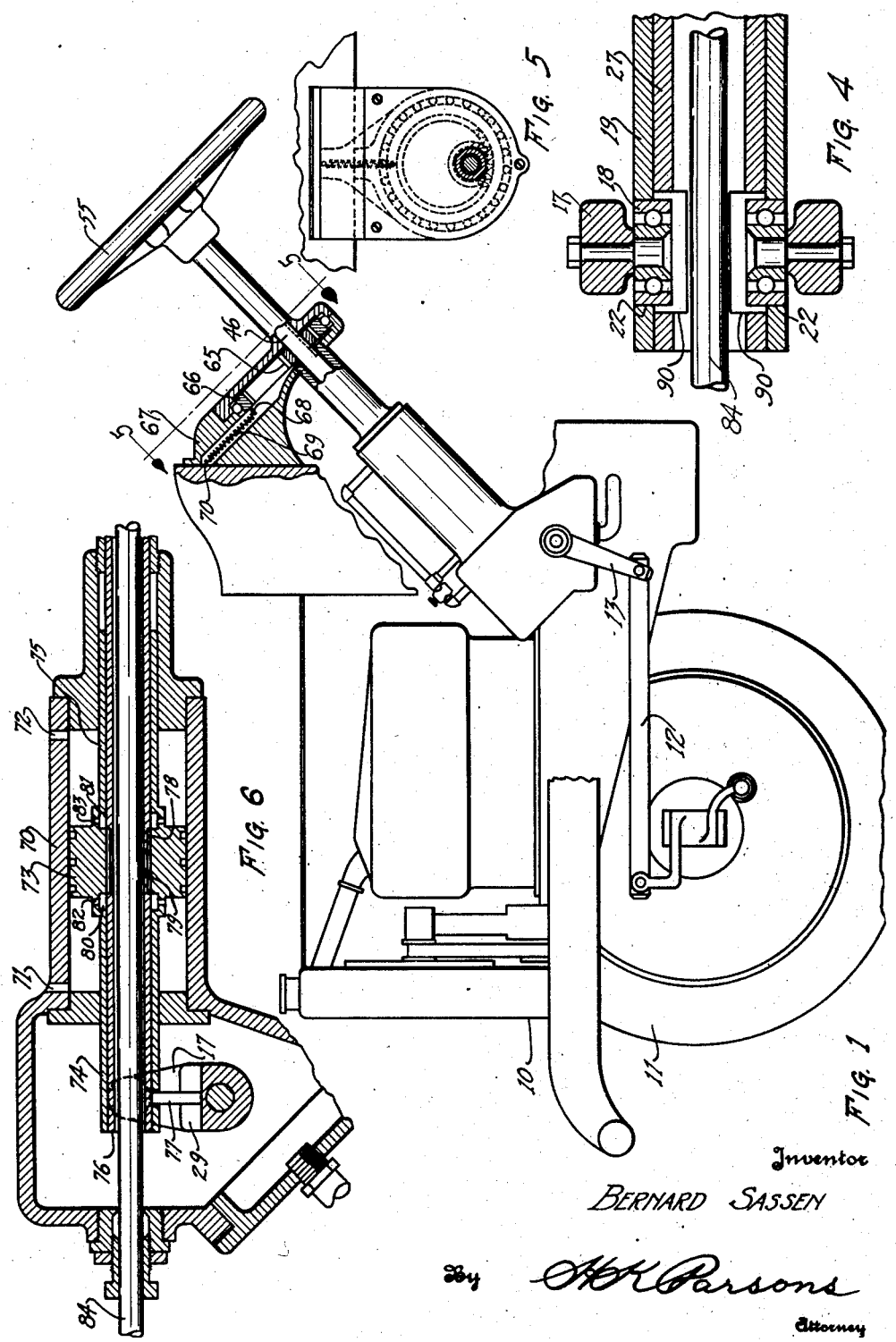

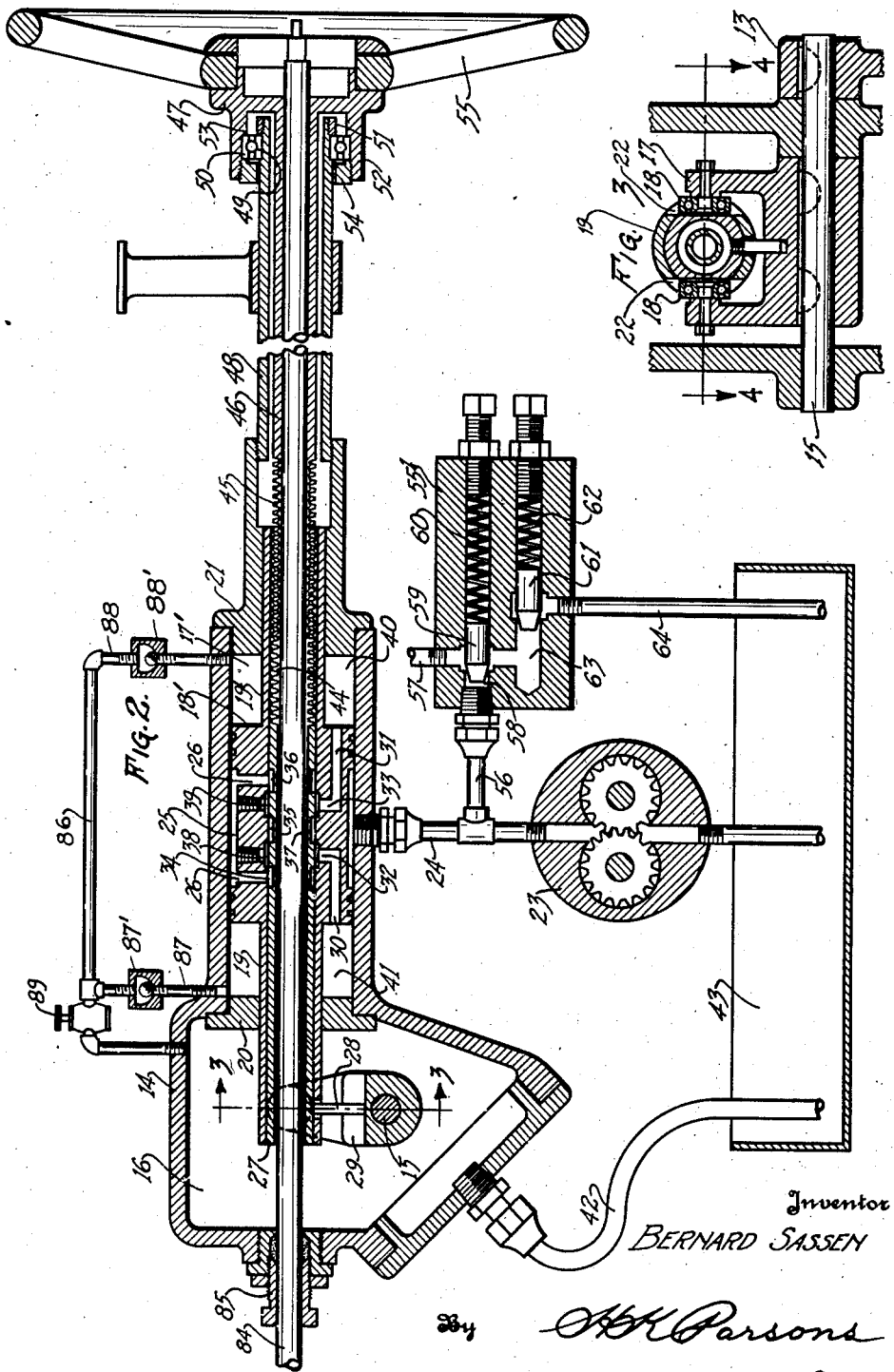

HYDRAULIC STEERING GEAR

Bernard Sassen, Cincinnati, Ohio, assignor to The Cincinnati Milling Machine Company, Cincinnati, Ohio, a corporation of Ohio Application March 27, 1930, Serial No. 439,470

5 Claims. (Cl. 180—79.2)

This invention relates to a steering mechanism for self-propelled vehicles such as automobiles, aeroplanes, motor boats and the like.

One of the objects of this invention is the provision of a new and improved means for relieving the burden of physical effort necessary to the proper directing of a motor driven conveyance whereby practically no appreciable effort is required to maintain a straight path and only a small amount necessary to divert from that path. In other words, the improvements constituting this invention contemplate the use of a force already existing in a power driven vehicle and so adapting and controlling it that it may be utilized to perform the physical work necessary to the steering or directing of a vehicle.

Another object of this invention is the provision of a simplified hydraulically operated steering mechanism having an actuating member which is so mounted between opposing forces that it will absorb exterior shocks on the terminal member of the steering mechanism and thus prevent their transmission to the steering wheel.

The further object of this invention is the provision of an actuator for operating the steering mechanism of a motor vehicle that is mounted between opposing forces and mechanism whereby the opposing forces will always be equalized in all positions of adjustment thus eliminating the necessity for constant manual guidance, once the direction of movement has been selected.

Other objects and advantages of the present invention should be readily apparent by reference to the following specifications considered in conjunction with the accompanying drawings illustrative of one embodiment thereof but it will be understood that any modification may be made in the specific structural details hereinafter disclosed within the scope of the appended claims without departing from or exceeding the spirit of the invention.

Referring to the drawings in which like reference numerals indicate like parts:

Figure 1 is an elevation showing the invention embodied in a motor vehicle.

Figure 2 is a diagrammatic view of one form of the invention.

Figure 3 is a section on the line 3—3 of Figure 2.

Figure 4 is a detailed view as on the line 4—4 of Figure 3.

Figure 5 is a view as on the line 5—5 of Figure 1.

Figure 6 is a modified form of the invention.

The improvements constituting this invention have been embodied for illustrative purposes in the motor vehicle shown in Figure 1, in which the reference numeral 10 indicates generally the body of a vehicle having in this instance front wheels 11 which are connected for steering purposes to the drag link 12 and drop arm 13 in the usual manner.

A casing or housing 14 is attached to the frame of the vehicle in any well-known manner and has its interior divided into two chambers. A rock shaft 15 is journaled in the walls of the casing in the lower chamber 16 and has a drop arm 13 keyed to an exterior projection thereof, while a bifurcated steering arm 17 is keyed thereto within the chamber 16, the steering arm having an anti-friction bearing 18 attached to the end of each fork thereof.

The upper chamber 17' of the casing is in the form of a cylinder in which is reciprocably mounted the piston 18' having the integral extensions or piston rods 19 and 19' which are slidably mounted in the opposing ends 20 and 21 of the cylinder respectively. The piston rod 19 has opposed lateral slots 22 formed in the end thereof for the reception of the bearings 18, thus forming an operative connection between the piston 18' and the drop arm 13 whereby rectilinear movement of the piston will effect resultant angular movement in the wheels 11.

In order to effect reciprocation of the piston, a source of fluid pressure is provided which in this instance may be a gear pump 23 such as usually is supplied with a motor vehicle, or in the absence of which, a special pump may be provided for this purpose. In either case a pressure line 24 connected to the pump is attached to the periphery of the cylinder intermediate the ends thereof. The piston 18' is provided with a wide peripheral groove 25 adapted to register throughout the range of piston movement with the pipe 24 and radial channels 26 communicating therewith for conducting or leading the fluid pressure to the valve member 27 which is slidably mounted in an axial bore of the piston rods and held against rotation by the pin 28 affixed thereto and engaging a slot 29 in the arm 17. The piston is further provided with longitudinal channels 30 and 31 which terminate in radial channels 32 and 33 also communicating with the valve member 27. The open ends of the channels 30 and 31 connect with chambers in opposite ends of the cylinder. The valve member 27 has formed on its periphery a plurality of spaced annular grooves 34, 35 and 36. The grooves 34 and 36 are adapted to register with the radial pressure channels 26 while the groove 35 communicates by means of a plurality of radial holes 37 with the interior of the valve member to form an exhaust or return outlet to reservoir. The radial channels 32 and 33 communicate with annular grooves 38 and 39 formed on the interior surface of the piston. From the construction it should be apparent that these grooves 38 and 39 are so positioned as to be connected simultaneously, one with a pressure supply and the other with an exhaust upon relative longitudinal movement between the valve and piston. In order to effect a desired amount of movement of the piston in a given direction, the valve member 27 is moved that amount in the desired direction. If the movement is to the left in Figure 2, the pressure will flow from the channel 26 to the groove 36 in the valve member thence to the groove 39 in the piston and by means of the channels 33 and 31 to the chamber 40 at one end of the cylinder. Fluid which is in the opposing chamber 41 will flow by means of channels 30 and 32 to the annular groove 38 in the piston thence to the annular groove 35 in the valve member 27 where it will discharge by means of the radial holes 37 to the interior of the valve and flow to the chamber 16, from which it will drain by means of a pipe connection 42 back to the reservoir 43.

This movement of the piston will be transmitted to the arm 17 by means of the bearings 18, causing rotation of shaft 15 which will move the drop arm 13 thereby actuating the steering mechanism to effect a change of direction in the movement of the vehicle.

It will be noted that the piston will follow up the movement of the valve, and upon cessation of the valve movement, the piston will again assume the same relative position with respect to the valve that is shown in Figure 2. The movement of the piston will stop due to the grooves 38 and 39 being out of register with the grooves 34, 35 and 36. Each chamber 40 and 41 will however still be full of the working fluid preventing movement of the piston in either direction and thus establishing means to absorb any exterior shocks to the wheels 11 and preventing their regeneration to the steering wheel 55.

The chambers 40 and 41 are originally filled with fluid by moving the valve to one end of its travel thereby filling the opposite end of the cylinder with oil and then the operation is reversed to fill the other end. In order to insure that the air will not be trapped in the cylinder upon the admittance of the fluid, an escape is provided which may take the form of a pipe 86 having branches 87 and 88 connected to opposite ends of the cylinder. The pipe 86 communicates with the chamber 16 so that any oil which passes off with the air will return to the reservoir. A valve 89 is provided in the pipe 86 to prevent further escape of oil after the system has been filled. To maintain independence between the cylinder chambers 40 and 41, check valves 87' and 88' are inserted in the branches 87 and 88, respectively.

The end 44 of the valve member 27 is interiorly threaded for engagement with the threaded end 45 of the tubular extension 46 of the steering wheel hub 47. An extension 48 is threaded into the end of the cylinder head 21 to form a steering column and has mounted on its reduced end 49 the self-aligning anti-friction bearing 50. The inner race of the bearing is held between the shoulder formed by the reduced end 49 and the collar 51 threaded thereon. The hub 47 is supported on the outer race of the bearing and is clamped or fixed thereto by means of the shoulder 53 which engages one side of the race and the annular member 54 threaded into the end of the hub and engaging the other side of the race. It is thus seen that the steering wheel hub is firmly attached to the outer race and that the inner race is attached to the column, thus providing a very efficient and self-aligning bearing for the steering wheel 55.

In operation, rotation of the steering wheel 55 will cause rotation of the screw 45 and consequent travel of the nut portion 44 of the valve thereby effecting longitudinal movement of the valve. It should be apparent that as the valve member is moved the piston will follow and it is therefore only necessary to exert a sufficient amount of physical effort to rotate the thread 45 in order to effect movement of the steering mechanism.

The pump 23 may be used for supplying a low pressure lubricating system and for this purpose a valve body 55' is provided having a connection 56 with the pump and a connection 57 with a lubrication system. A channel 58 in the valve body communicating with the pipe 56 is provided with a high pressure relief valve 59 having a spring 60 which tends to maintain the valve in closed position. A low pressure relief valve 61 is also provided in the valve body and held in closed position by the spring 62. The operation is such that upon the pressure in the channel 58 exceeding the pressure of the spring 60 the valve 59 will open permitting a flow of fluid through the channel 57 to the lubrication system and should the back pressure in the lubrication system be greater than the spring 62 of the low pressure relief valve, the latter will open and permit the fluid to return to the reservoir 43 by means of the pipe 64.

Referring now to Figures 1 and 5, the extension 46 of the steering wheel hub may be provided with a pinion gear 65 keyed thereto and meshing with an internal gear 66 which is mounted in an anti-friction bearing in the bracket 67 attached to the dash board of the machine. This arrangement assists the operator to neutralize the steering mechanism or in other words, to move the piston to a center position with respect to the longitudinal axis of the cylinder whereby the wheels 11 will lie in a plane parallel to the longitudinal axis of the vehicle to permit travel in a straight line. To this end a pin 68 is firmly fixed in the under side of the internal gear 66 and connected by a spring 69 with a pin 70 fixed on the dash board so that when the parts are in the position as shown in Figure 5 the spring is contracted to its shortest length and upon rotation of the internal gear by the pinion 65 will be expanded. It is thus apparent that whenever the steering wheel 55 is moved from neutral position there is a constantly acting force which tends to return it to its neutral position.

A modified form of piston and cylinder suitable for use herein is shown in Figure 6 in which the reference numeral 70 indicates the cylinder having pressure intakes 71 and 72 at its opposing ends respectively. A piston 73 is reciprocably mounted therein and has the integral piston rods 74 and 75 which project through opposed ends of the cylinder. A valve member 76, held against rotation by the pin 77 fixed thereto and sliding in the slot 29 of the arm 17, is slidably mounted in an axial bore of the piston and piston rods and is provided with a wide peripheral groove 78 having a plurality of radial bores or exhaust ports 150

79 forming an exhaust or discharge outlet to the interior of the member. Interior annular grooves 80 and 81 are formed at opposed ends of the piston respectively and are in constant communication with the respective cylinder chambers on opposed sides of the piston by means of radial passages 82 and 83 respectively so that the grooves are constantly under pressure. Since the groove 78 in the valve member is wide enough to extend to the edge each of the grooves 80 and 81, it is apparent that a slight longitudinal movement in either direction of the member 76 will connect one of the grooves 80 or 81, with the exhaust port 79. This movement of the valve member will cause a differential pressure in the opposing ends of the cylinder and consequently movement of the piston 73 which, in turn, through the connections described above, will operate the steering arm 17. It is apparent that the piston will follow the movement of the valve until the ports or grooves 80 and 81 are again in the same relative position with respect to the groove 78 as is shown in Figure 6 whereupon the pressure in opposing cylinder chambers will equalize thereby preventing further movement of the piston. In order to nullify the effect of one end of the cylinder bleeding the pressure from the other end as would be the case if the ports 71 and 72 were connected to a common pressure line, the ports may be connected by separate passages to individual pumps so that the pressure supply to each end of the cylinder will be independent. This means that instead of using one pump as shown in the present embodiment, a pair of pumps such as 23 could be used. If desirable, adjustable relief valves may be provided for each line in order to insure that the unit pressure for each line is the same.

In both embodiments, a pipe such as 84 is provided which extends longitudinally through the axial center of the member 27 and the member 46 having one end extending slightly above the hub of the steering wheel 55 and the other end extending through the lower end of the casing 14 through the packed joint 85. This pipe may be used for the enclosure of wires or other appurtenances necessary to the operation of the machine, but attention is called to the fact that the outside diameter of this pipe is smaller than the inside diameter of the valve member 27 thus insuring that there will be a sufficient space between them to permit the exhaust fluid to flow from the outlet passage 37 to the chamber 16.

It often happens that it is necessary to steer a vehicle when the engine is not running in which case no hydraulic pressure would be available and resort must be had to manual operation. In view of such possibility, provision is made for operating the steering arm from the steering wheel by a mechanical connection when for any reason there is no pressure in the system. Referring to Figure 4, it will be noted that the valve member 27 has formed on opposing sides near its end, the recess 90 for the reception of the anti-friction bearings 22. These recesses are larger than the bearings to provide a small clearance on each side. This clearance permits sufficient longitudinal movement of the valve with respect to the piston to cause movement of the latter by hydraulic means but it will be noted that if the piston and consequently its piston rod 19 fail to follow up the movement of the valve, that the valve member will then engage the bearing 18 of the steering arm 17 causing movement thereof mechanically. This arrangement provides a mechanical steering means available at any time that the pressure fails without the necessity of any adjustment or further attention.

The method of operation of the steering mechanism is as follows: the pump 23 being connected to the prime mover of the machine will of course be operated when the prime mover is started and thereby supply oil under pressure to the lubricating system and to the pressure groove 25 of the piston 18. If the cylinder is empty, it may be filled by alternately opening the valves at opposite ends of the cylinder in the manner previously described. As the system finally fills, the piston will adjust itself relative to the valve grooves because the pressure must equalize in opposite ends of the cylinder. This means also that the front wheels will be turned to a position corresponding to the position of the steering wheel.

Assuming the front wheels of the vehicle to be parallel, rotation of the steering wheel will cause rotation of screw 45 and thereby longitudinal movement of the surrounding nut 44. If the direction of rotation is such as to cause the nut 44 to move toward the left as viewed in Figure 2, the annular groove 35 in member 44 will be moved in registry with port 32 whereby the fluid in chamber 41 will pass out through channel 30, port 32, groove 35 and radial holes 37 to the annular space between tube 84 and member 44 and since these ports are inclined, the escaping fluid will collect in chamber 16 and return through pipe 42 to the reservoir 43. At the same time pressure groove 36 will be moved to couple port 26 with port 33, permitting a pressure flow to chamber 40. This will result in movement of piston 18 to the left which, through the interconnections comprising lever 29, rod 15, lever 13 and connecting link 12, will cause adjustment of the steering wheels 11.

If the steering wheel 55 is rotated in the opposite direction, the conditions will be reversed, pressure being admitted to chamber 41 and fluid being exhausted in chamber 40. In either case as the piston moves, it re-establishes the arrangement of grooves and ports as shown in Figure 2, so that after it has moved a predetermined amount as determined by the movement of member 44, it will automatically stop itself.

That which is claimed is:

1. In a device of the class described having a piston and cylinder for actuating the steering arm of a self-propelled vehicle, said cylinder having a pressure port intermediate the ends thereof, a pump, a conduit connecting the pump to said port, an annular pressure groove formed on the periphery of the piston of sufficient width to be in constant communication with said port during all adjustments of the piston, an axial bore formed in the piston, a pair of longitudinally spaced radial channels formed in the groove terminating in pressure ports in the bore, a tubular plunger member reciprocably mounted in the piston bore, longitudinally spaced annular grooves formed on the periphery of the plunger and normally registering with said pressure ports, an exhaust annular groove formed on the plunger intermediate the pressure grooves, means connecting the exhaust groove with the interior of the plunger, means at the lower end of the plunger for collecting exhaust fluid and returning the same to reservoir, annular recesses formed in the bore of the piston between either side of the exhaust groove and the pressure grooves, means connecting respective recesses with respective ends of the cylinder, said recesses being so positioned that movement of the plunger in either direction from its neutral position will effect connection of one recess with a pressure groove and the other recess with the exhaust groove thereby effecting longitudinal movement of the piston in the direction of movement of the plunger to effect actuation of the steering mechanism, the subsequent movement of the piston repositioning the annular recesses between the pressure and the exhaust grooves in such a manner as to stop all flow from the pressure groove and thereby automatically stopping the piston movement.

2. In combination with a steering arm of a self-propelled vehicle steering mechanism, of power means for actuating said arm to determine the direction of movement of the vehicle including a piston and cylinder, a tubular piston rod operatively connecting the piston to said steering arm for positive operation thereof upon movement of the piston, a source of fluid pressure, a plunger reciprocably mounted in the piston rod for movement relative thereto, cooperating valve portions on the rod and plunger for determining the cylinder end to be coupled to pressure and thereby the direction of movement of the piston, a manually operable hand wheel for advancing the plunger in either direction to effect movement of the piston in the selected direction, termination of the follow-up movement of the piston automatically closing the valve whereby the steering arm will be positioned in accordance with the position of the steering wheel, and a lost motion connection between the plunger and steering arm, said lost motion being eliminated upon failure of the piston rod to follow up movement of the plunger whereby the steering arm may be manually operated by the steering wheel.

3. In a self-propelled vehicle having a steering arm for determining the direction of movement thereof, the combination of a fluid operable mechanism for operating said arm including a fluid operable motor, a fluid pump, a manually operable valve for controlling the delivery of fluid to said motor, a pressure channel coupling the pump to said valve, a lubricating system for the vehicle, a first relief valve set to maintain a relative high operating pressure for said steering mechanism in said channel, means coupled with the relief valve for delivering the escaping fluid therefrom to the lubricating system, a second relief valve associated with said system and set to maintain a pressure relatively lower than that determined by the first relief valve, a common reservoir for receiving the escaping fluid from the second relief valve, and the spent fluid from said motor, and an intake for said pump extending into the common reservoir whereby a single pump may be utilized for supplying fluid at differential pressures to said motor and system.

4. A self-propelled vehicle having a steering mechanism including a steering column, a power operable motor mounted in the column for actuation of said mechanism, said column terminating in an upwardly extending tubular portion, a power controlling member for the motor mounted in the column, an operating shaft for said control member extending through the tubular portion in spaced relation thereto, and projecting beyond the end thereof, an operating hand wheel secured to the end of said shaft, and an anti-friction bearing having its inner race secured to the tubular portion, and its outer race secured to the hand wheel for maintaining the hand wheel in self-aligning position with respect to said tubular portion.

5. A steering mechanism for a motor driven vehicle comprising a steering gear, power actuable means therefor, including a steering column having a cylinder formed therein, a piston and integral piston rod contained in the cylinder, means positively connecting the piston rod to the steering gear, a source of fluid pressure, valve means for determining the admission of pressure to said cylinder and thereby the direction of movement of the piston rod and connected mechanism, said valve means including a reciprocable tubular plunger, interior threads formed on one end of the plunger, a manually operable hand wheel having an integrally threaded shank engaging the threads of said plunger whereby rotation of the hand wheel will effect axial movement of the plunger and thereby power operation of the steering gear, and lost motion means connecting the plunger to said steering gear whereby upon failure of the piston to move in accordance with the movement of said valve means the hand wheel will be directly connected to the steering arm for manual actuation.

BERNARD SASSEN.